(12) United States Patent
Akita

(10) Patent No.: US 10,050,724 B2
(45) Date of Patent: Aug. 14, 2018

(54) COMMUNICATION SYSTEM

(71) Applicant: DENSO CORPORATION, Kariya, Aichi-pref. (JP)

(72) Inventor: Hironobu Akita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/565,706

(22) PCT Filed: Mar. 28, 2016

(86) PCT No.: PCT/JP2016/001785
§ 371 (c)(1),
(2) Date: Oct. 11, 2017

(87) PCT Pub. No.: WO2016/170736
PCT Pub. Date: Oct. 27, 2016

(65) Prior Publication Data
US 2018/0076905 A1     Mar. 15, 2018

(30) Foreign Application Priority Data

Apr. 24, 2015 (JP) .................................. 2015-089295

(51) Int. Cl.
| | | |
|---|---|---|
| H04B 15/00 | (2006.01) | |
| H04L 29/08 | (2006.01) | |
| H04B 3/04 | (2006.01) | |
| H04H 20/76 | (2008.01) | |

(52) U.S. Cl.
CPC ............. H04B 15/005 (2013.01); H04B 3/04 (2013.01); H04L 29/08 (2013.01); H04H 20/76 (2013.01)

(58) Field of Classification Search
CPC ............ H04B 15/00; H04B 3/04; H04L 28/08
USPC ........ 700/94; 455/422, 296, 297, 298, 343.1
See application file for complete search history.

(56) References Cited

U.S. PATENT DOCUMENTS

| | | | |
|---|---|---|---|
| 9,014,283 B2 | 4/2015 | Akita et al. | |
| 2002/0094035 A1* | 7/2002 | Okada .............. | H04B 10/25752 375/295 |
| 2005/0136871 A1* | 6/2005 | Patel ...................... | H04B 15/02 455/222 |

FOREIGN PATENT DOCUMENTS

| | | |
|---|---|---|
| JP | 2006-303795 A | 11/2006 |
| JP | 2014-158208 A | 8/2014 |

OTHER PUBLICATIONS

"9 Foundations of digital system" [online], the Internet (URL: http://www.t-net.ne.jp/~kondoy/lecture/bme/09.pdf) (known by applicant as early as Mar. 9, 2015).

(Continued)

*Primary Examiner* — Melur Ramakrishnaiah
(74) *Attorney, Agent, or Firm* — Posz Law Group, PLC

(57) ABSTRACT

The present disclosure provides a communication system. The communication system includes a radio wave receiver; a transmission node that transmits data; and a reception node that receives the data from the transmission node. The transmission node changes a transmission rate of the data so that a notch point at which a spectrum of a communication waveform decreases overlaps with a frequency selected by the radio wave receiver.

11 Claims, 8 Drawing Sheets

(56) References Cited

OTHER PUBLICATIONS

Iwata Toshio, "Introduction to Practical Digital Filter Design", CQ Publishing Company, p. 168-169, Oct. 2004.
"9 Foundations of digital system" [online], the Internet (URL:http://www.t-net.ne.jp/~kondoy/lecture/bme/09.pdf).
Iwata Toshio, "Introduction to Practical Digital Filter Design", CQ Publishing Company, p. 168-169.

* cited by examiner

SELECTED FREQUENCY = 1.5 [MHz]
TRANSMISSION RATE = 1.5 [Mbps]

COMMUNICATION SYSTEM

CROSS REFERENCE TO RELATED APPLICATIONS

The present application is the U.S. national phase of International Patent Application No. PCT/JP2016/001785 filed on Mar. 28, 2016 and is based on Japanese Patent Application No. 2015-89295 filed on Apr. 24, 2015, the contents of which are incorporated herein by reference.

TECHNICAL FIELD

The present disclosure relates to a communication system that transmits and receives data between multiple nodes.

BACKGROUND ART

In a wired communication, even when a communication using a differential signal is performed with the use of, for example, a twisted pair cable, some imbalance occurs and the symmetry collapses, and a common mode that causes unnecessary radiation occurs. An allowable level of the unnecessary radiation is regulated by law, and if the unnecessary radiation is equal to or lower than the allowable level, no problem occurs in regulations. However, for example, since AM radio is particularly susceptible to an external noise, the degradation of sound quality occurs even with unnecessary radiation at a level that is not problematic in terms of regulations. In particular, in a radio mounted in a vehicle, a decline in the sound quality leads to deterioration of a quality of the vehicle as a whole. For that reason, an allowable level lower than the legal level is set and unnecessary radiation is regulated at a more severe level.

PRIOR ART LITERATURES

Patent Literature

Patent Literature 1: JP 2014-93682 A

Non-Patent Literatures

Non-patent Literature 1: [online], the Internet (URL: http://www.t-net.ne.jp/~kondoy/lecture/bme/09.pdf)
Non-patent Literature 2: Iwata Toshio, "Introduction to Practical Digital Filter Design", CQ Publishing Company, p. 168-169

SUMMARY OF INVENTION

When the allowable level of the unnecessary radiation is set to be low, there is a need to perform a network communication in the vehicle at a low data rate in order to satisfy the allowable radiation level. For that reason, the data rate may be insufficient when operating some applications having specific use purposes. In order to deal with such a case, for example, a configuration in which multiple communications are performed in parallel is required. In addition, when a network that requires a high data rate is built, there is a need to provide a common mode choke for reducing the occurrence of a common mode and the like. As described above, in order to avoid the degradation of the sound quality of the radio, some configuration needs to be added, and this causes an increase in cost.

In view of the above, it is an object of the present disclosure to provide a communication system that is capable of avoiding the degradation of a sound quality of a radio wave receiver, such as a radio without causing an increase in cost.

According to an example of the present disclosure, a communication system includes a radio wave receiver, a transmission node that transmits data; and a reception node that receives the data transmitted from the transmission node. The transmission node changes a transmission rate of the data based on a frequency selected by the radio wave receiver. In this communication system, the transmission rate is automatically changed according to the frequency selected in the radio wave receiver so as to reduce the noise. According to this configuration, there is no need to add other configuration in order to avoid the degradation of the sound quality of the radio wave receiver. Therefore, the decrease in the sound quality of the radio wave receiver, such as radio can be avoided without causing an increase in cost.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, multiple embodiments will be described with reference to the drawings. Hereinafter, in the respective embodiments, substantially the same elements are denoted by identical symbols, and repetitive description will be omitted.

(First Embodiment)

Figure 1:
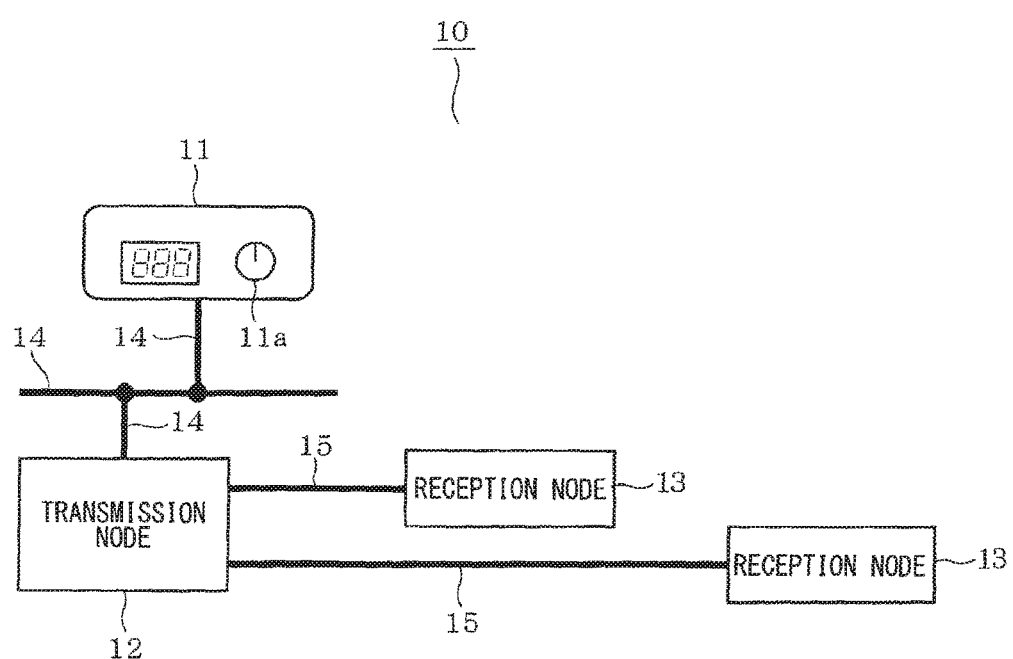
FIG. 1 is a diagram schematically illustrating a configuration example of a communication system according to a first embodiment.

A communication system 10 illustrated in FIG. 1 is mounted in a vehicle, and includes a vehicle radio 11, a transmission node 12, and a reception node 13. The vehicle radio 11 is an example of a radio wave receiver and includes an operation unit 11a for selecting a channel. The transmission node 12 and the reception node 13 are communication nodes for building an in-vehicle LAN. In this case, the vehicle radio 11 and the transmission node 12 are communicably connected to each other by a wired communication cable 14 for low-speed communication. In this case, the transmission node 12 and the reception node 13 are communicably connected to each other by a wired communication cable 15 for high-speed communication.

Figure 2:
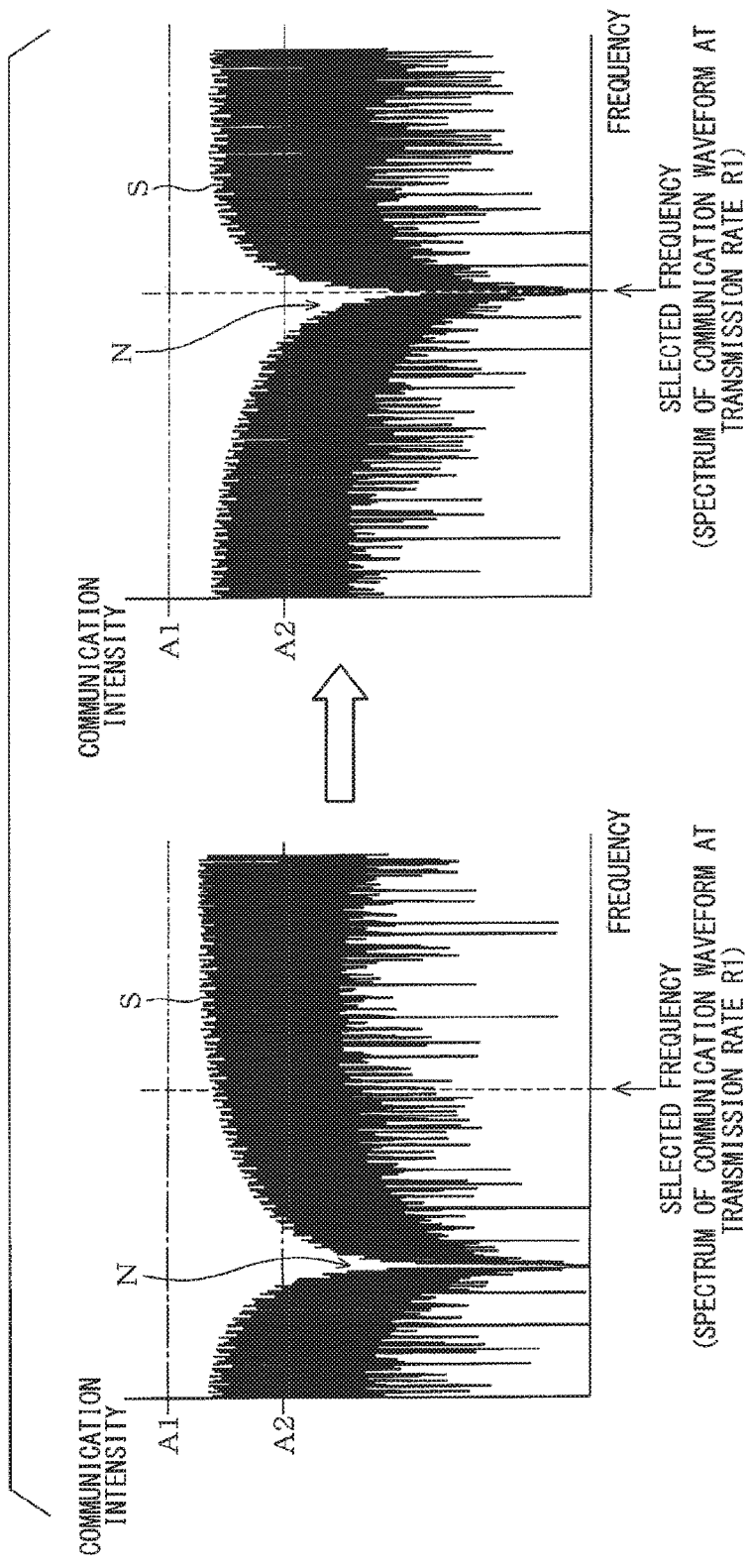
FIG. 2 is a diagram illustrating before and after changing a transmission-reception rate of data based on a selected frequency.

When a user selects the channel through the operation unit 11a, the vehicle radio 11 notifies the transmission node 12 of a selected frequency packet indicating a frequency corresponding to the selected channel through the wired communication cable 14. The selected frequency packet is an example of the selected frequency information indicating the frequency selected in the vehicle radio 11. Upon receiving the selected frequency packet from the vehicle radio 11, the transmission node 12 changes the data transmission rate from a transmission rate R1 to a transmission rate R2 as illustrated in FIG. 2 based on the frequency indicated by the information.

A spectrum S of a communication waveform before changing the transmission rate is equal to or lower than a legal level A1 at the selected frequency selected in the vehicle radio 11, but exceeds a radio noise level A2 which is lower than the legal level A1. For that reason, there is a possibility that noise may be generated and the sound quality of the vehicle radio 11 may be lowered. Therefore, the transmission node 12 changes the transmission rate so that a notch point N at which the spectrum S of the communication waveform decreases overlaps with the selected frequency of the vehicle radio 11. As a result, the spectrum S of the communication waveform becomes lower than the radio noise level A2 at the selected frequency of the vehicle radio 11. This makes it difficult for noise to occur, and makes it possible to avoid the deterioration in sound quality of the vehicle radio 11.

In addition, the transmission node 12 changes the transmission rate so as to satisfy the following expression (1) when the frequency selected in the vehicle radio 11 is X (MHz) and the transmission rate is Ya (Mbps).

$$X = k \times Ya \quad (1)$$

k: any integer

Figure 3:
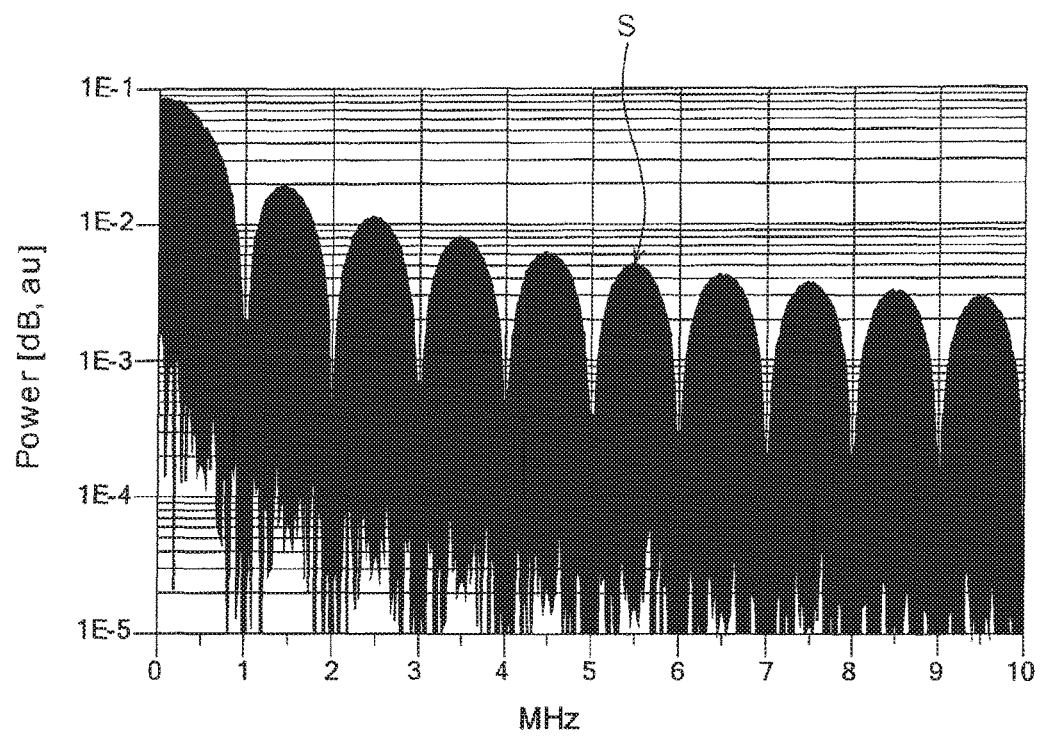
FIG. 3 is a diagram illustrating an example of changing the transmission-reception rate of data based on the selected frequency.

In other words, the transmission node 12 changes the transmission rate so that X becomes an integral multiple of Ya. FIG. 3 shows the spectrum S of the communication waveform in the case of X=1.0 (MHz) and Ya=1.0 (Mbps). In other words, in this case, the transmission node 12 changes the transmission rate so as to satisfy X=Ya. At the frequency X=1.0 (MHz), the transmission node 12 realizes a state in which the spectrum S of the communication waveform becomes lower than the radio noise level A2.

Figure 4:
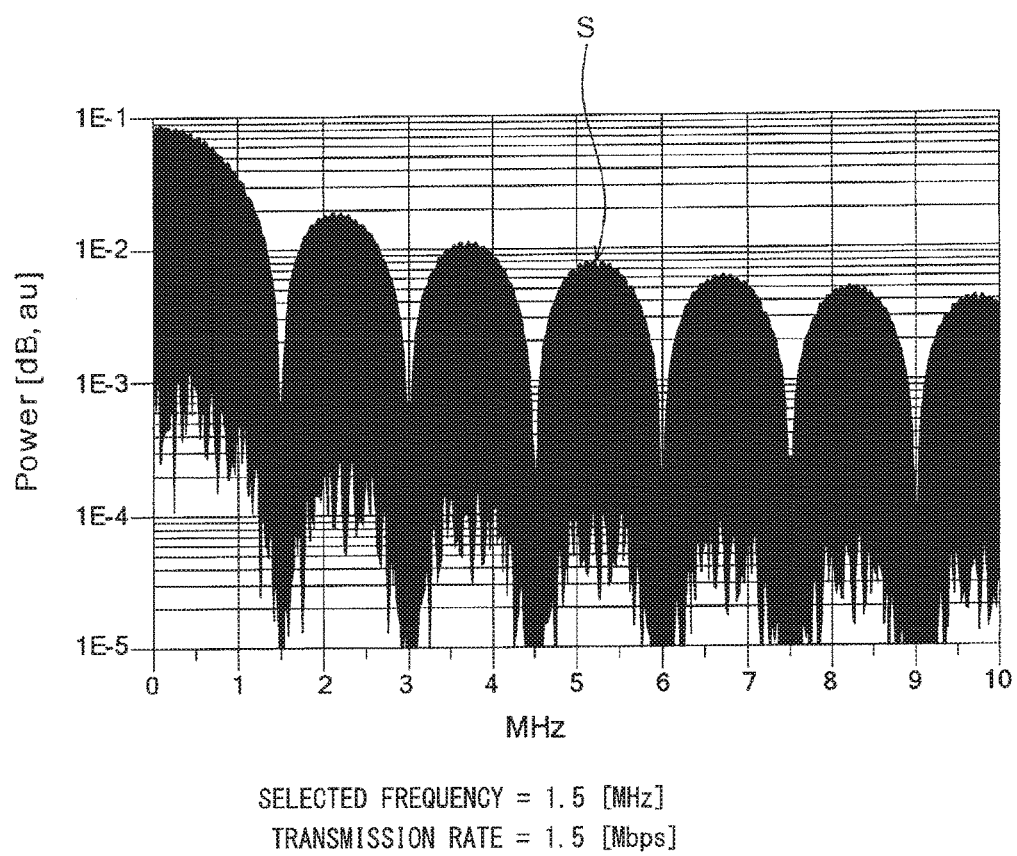
FIG. 4 is a diagram illustrating another modification of the transmission-reception rate of data based on the selected frequency.

FIG. 4 shows the spectrum S of the communication waveform in the case of X=1.5 (MHz) and Ya=1.5 (Mbps). In other words, similarly, in this case, the transmission node 12 changes the transmission rate so as to satisfy X=Ya. At the frequency X=1.5 (MHz), the transmission node 12 realizes a state in which the spectrum S of the communication waveform becomes lower than the radio noise level A2.

Figure 5:
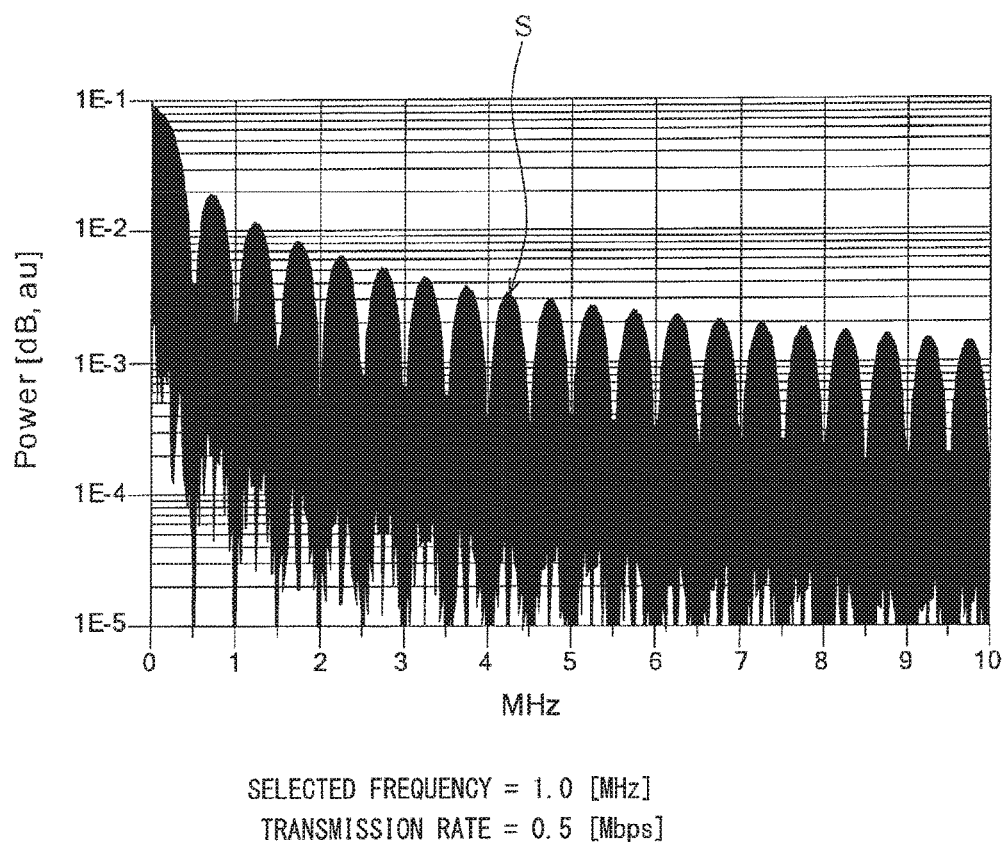
FIG. 5 is a diagram illustrating still another modification of the transmission-reception rate of data based on the selected frequency.

FIG. 5 shows the spectrum S of the communication waveform in the case of X=1.0 (MHz) and Ya=0.5 (Mbps). In other words, in this case, the transmission node 12 changes the transmission rate so as to satisfy X=2×Ya. At the frequency X=0.5 (MHz), the transmission node 12 realizes a state in which the spectrum S of the communication waveform becomes lower than the radio noise level A2.

In this manner, the transmission node 12 appropriately adjusts the transmission rate by leveraging the fact that the notch point N of the spectrum S of the communication waveform fluctuates in conjunction with the transmission rate, as a result of which the spectrum S of the communication waveform at the selected frequency X is made lower than the radio noise level A2.

The radiation power of unnecessary radiation is obtained by multiplying the spectrum S of the communication waveform by radiation characteristics. In this example, the radiation characteristics are hardly controlled because the radiation characteristics depend on the system. For that reason, the control of the radiation power depends exclusively on the position of the notch point N in the spectrum S of the communication waveform, in other words, on the adjustment of the transmission rate. In other words, the spectrum of the unnecessary radiation shows a characteristic approximate to the spectrum S of the communication waveform. Therefore, the transmission rate is adjusted based on the selected frequency as described above, there being capable of efficiently controlling the radiation power.

According to the communication system 10, the transmission rate is automatically changed according to the frequency selected in the vehicle radio 11 so as to reduce the noise. According to the configuration, there is no need to add other configuration in order to avoid the degradation of the sound quality of the vehicle radio 11. Therefore, the decrease in the sound quality of the vehicle radio 11 can be avoided without causing an increase in cost.

(Second Embodiment)

Figure 6:
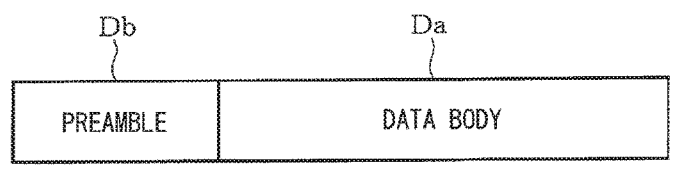
FIG. 6 is a diagram illustrating an example of a data structure output by a transmission node after changing the transmission rate according to a second embodiment.

In the present embodiment, when a transmission node 12 changes the transmission rate according to the selected frequency of a vehicle radio 11, as shown in FIG. 6, the transmission node 12 adds preamble data Db to a data body Da to be transmitted to a reception node 13. The preamble data Db is an example of transmission rate information indicating the changed transmission rate. In this case, the preamble data Db is configured by, for example, "0101 . . . " data of 10 bits.

The reception node 13 specifies the changed transmission rate based on the preamble data Db obtained from the transmission node 12. In this case, the reception node 13 specifies the changed transmission rate based on a toggle pattern of the preamble data Db. In other words, the reception node 13 specifies the changed transmission rate according to a length of time required for receiving, for example, 10-bit preamble data Db. When the reception node 13 specifies the changed transmission rate, the reception node 13 changes the receiving rate based on the transmission rate. In that case, the reception node 13 may adjust the receiving rate to the same rate as the transmission rate, or adjust the receiving rate to a rate that is an integral multiple of the transmission rate.

According to the present embodiment, the receiving rate is also adjusted based on the changed transmission rate. Therefore, the rates can be matched at both of the transmission side and the receiving side, and the noise can be reduced more effectively.

(Third Embodiment)

Figure 7:
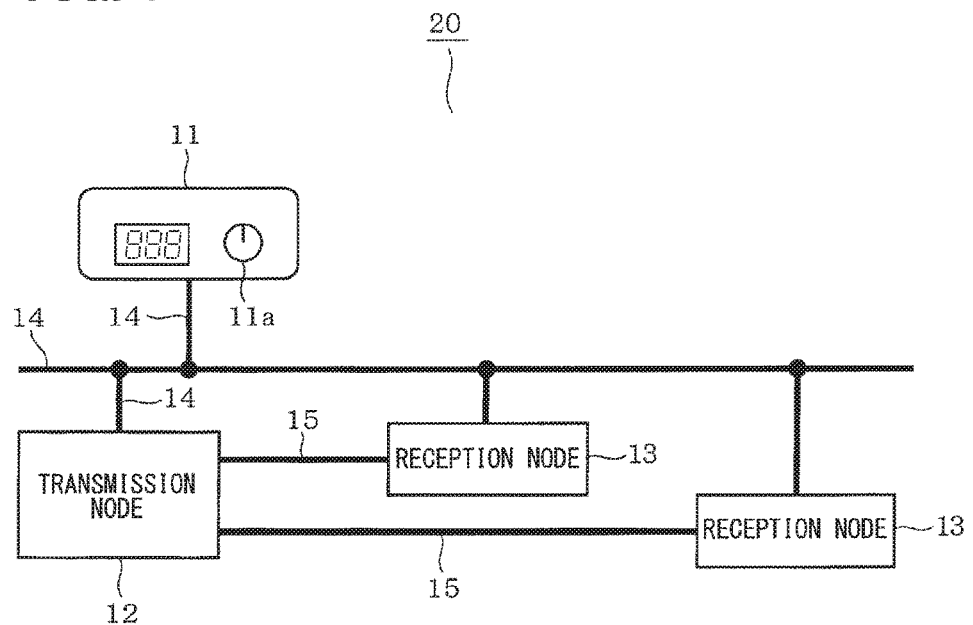
FIG. 7 is a diagram schematically illustrating a configuration example of a communication system according to a third embodiment.
Figure 8:
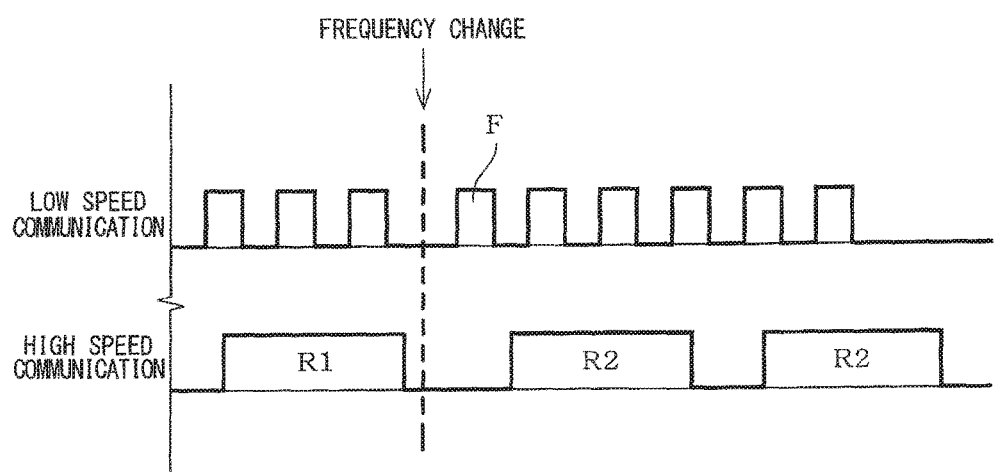
FIG. 8 is a timing chart illustrating an operation example of a communication system.

According to a communication system 20 illustrated in FIG. 7, a reception node 13 is also communicably connected to a vehicle radio 11 through a wired communication cable 14 for a low speed communication. In this configuration, when the selected frequency is changed, as shown in FIG. 8, the vehicle radio 11 notifies a transmission node 12 and the reception node 13 of a selected frequency packet F indicating a selected frequency through the wired communication cable 14. The transmission node 12 that has received the selected frequency packet F adjusts the transmission rate based on the frequency indicated by the selected frequency packet F, and the reception node 13 that has received the selected frequency packet F adjusts the receiving rate based on the frequency indicated by the selected frequency packet F As a result, the transmission-reception rates of data between the transmission node 12 and the reception node 13 are changed from a rate R1 that does not conform to the selected frequency of the vehicle radio 11 to a rate R2 that conforms to the selected frequency of the vehicle radio 11.

According to the present embodiment, the transmission-reception rates can be collectively adjusted for both of the transmission node 12 and the reception node 13 based on the selected frequency packet F outputted from the vehicle radio 11. Also, the rates can be matched on both of the transmission side and the receiving side, and a communication error in a high speed communication hardly occurs.

(Fourth Embodiment)

Figure 9:
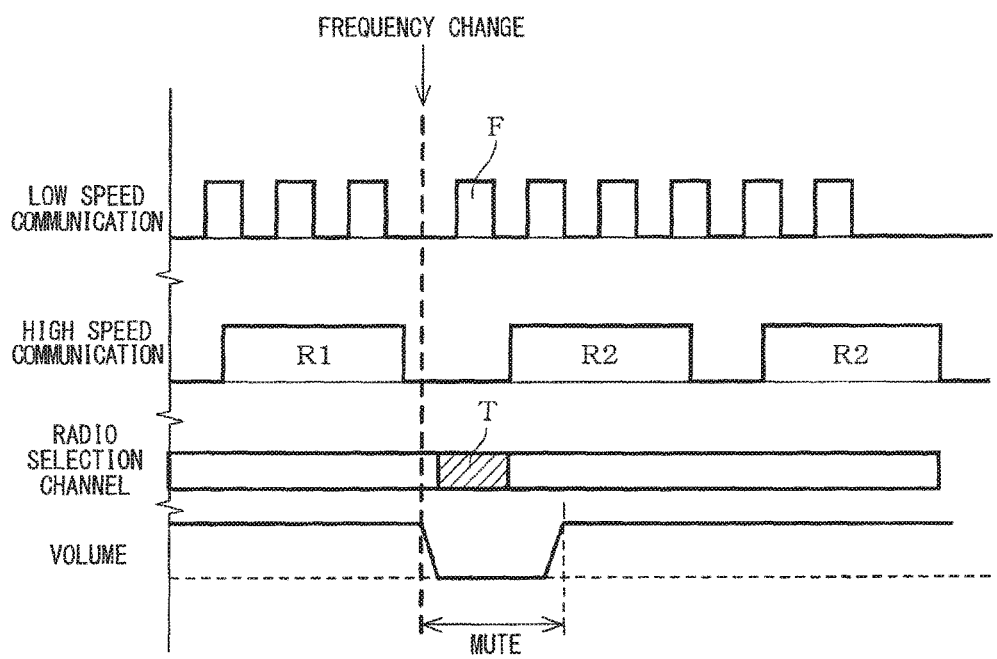
FIG. 9 is a timing chart illustrating a muting function of a general radio.

Generally, radio equipment such as a vehicle radio 11 performs a process of finely adjusting the frequency in order to tune the frequency to the channel when the channel is changed. For that reason, during the execution of the fine adjustment process, there is a possibility that noise arising from radio operation may occur regardless of a data communication. For that reason, as illustrated in FIG. 9, in a general radio, when the channel is changed, a period T for frequency fine adjustment processing is provided for a predetermined time. During the period T, a muting process for automatically lowering a volume of sound output is executed.

Figure 10:
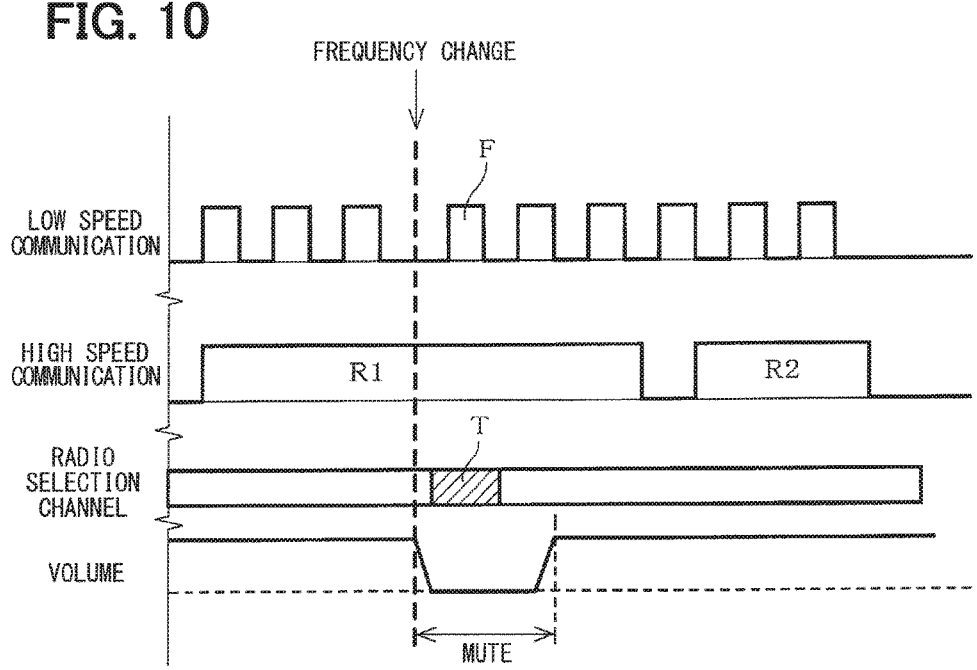
FIG. 10 is a timing chart illustrating an example in the case where the muting function is applied to the communication system.

The present embodiment is an embodiment leveraging the muting function. In other words, as illustrated in FIG. 10, when the channel of the vehicle radio 11 is changed during the high speed communication between a transmission node 12 and a reception node 13, even after the muting process has been completed, the high speed communication by a rate R1 not yet changed may be continued between the transmission node 12 and the reception node 13. For that reason, after the muting process has been completed, the unnecessary radiation caused by the data communication may cause noise to occur in the sound of the vehicle radio 11.

Figure 11:
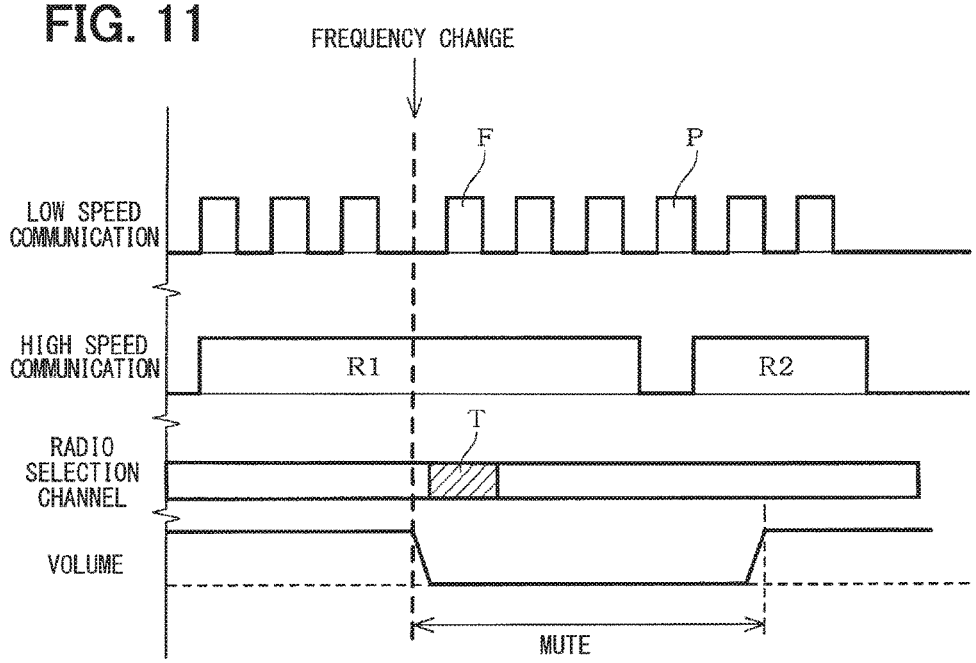
FIG. 11 is a timing chart illustrating an example in which a muting function is applied to a communication system according to a fourth embodiment.

Therefore, in the present embodiment, as illustrated in FIG. 11, the transmission node 12 notifies the vehicle radio 11 of a change completion packet P upon completion of a change in the transmission rate. Upon completion of the change in the receiving rate, the reception node 13 also notifies the vehicle radio 11 of the change completion packet P. The change completion packet P is an example of change completion information indicating that the change in the transmission rate or the receiving rate has been completed according to the selected frequency. When the frequency of the vehicle radio 11 has been changed, the vehicle radio 11 continues the muting process until the change completion packet P is obtained from the transmission node 12 and the reception node 13, that is, the change completion packet P is obtained from all of the nodes building the communication system 10. Upon obtaining the change completion packet P from all of the nodes, the vehicle radio 11 completes the muting process and returns the volume to an original level.

According to the present embodiment, the muting process is continued until the transmission rate of the transmission node 12 and the receiving rate of the reception node 13 are all adjusted. Therefore, the unnecessary radiation caused by the data communication can be prevented from generating noise to the sound of the vehicle radio 11. According to the present embodiment, the muting period is longer than that of a general radio. However, even if the muting period gets longer, the muting period can be reduced to 0.1 seconds or less, and therefore there is almost no possibility that the user perceives that the muting period has become long.

At least one of the transmission node 12 and the reception node 13 may be configured to output the change completion packet P. The vehicle radio 11 may be configured to complete the muting process on the condition that the change completion packet P is obtained from at least one of the transmission node 12 and the reception node 13.

(Other Embodiments)

The embodiment is not limited to the embodiments described above, and can be variously modified.

Similarly to a transmission node 12, a reception node 13 can be configured to change the receiving rate so that the selected frequency X (MHz) of the vehicle radio 11 becomes an integral multiple of the receiving rate Yb (Mbps). In addition, the reception node 13 can be configured to change the receiving rate so as to satisfy X=Yb. As described above, the adjustment process of the receiving rate in the reception node 13 is made identical with the adjustment process of the transmission rate in the transmission node 12, thereby being capable of adjusting the harmonious rate on the transmission side and the receiving side, and capable of reducing the noise more effectively.

The spectrum S of the communication waveform has multiple notch points N. For that reason, the notch points N tuned to the selected frequency of the vehicle radio 11 are not limited to the notch point N having the smallest frequency, and another notch point N may be leveraged.

The wired communication for connecting the vehicle radio 11 to the communication nodes 12 and 13 is not limited to the low speed communication but may be, for example, a high speed communication using a common mode choke, a shielded cable, an optical communication, or the like. It is preferable that the communication hardly influences noise on the vehicle radio 11.

The vehicle radio 11 may be various radio wave receivers such as an AM radio receiver, an FM radio receiver, a TV broadcast receiver, or a combination of those receivers.

The embodiment is not limited to the wired communication system including the vehicle radio 11 and the in-vehicle LAN, and a wireless communication system such as a portable communication system or a road-to-vehicle communication system may also be embodied. Moreover, the respective embodiments described above may be appropriately combined with each other.

The invention claimed is:

1. A communication system comprising:
a radio wave receiver;
a transmission node that transmits data; and
a reception node that receives the data transmitted from the transmission node, wherein
the transmission node changes a transmission rate of the data so that a notch point at which a spectrum of a communication waveform decreases overlaps with a frequency selected by the radio wave receiver.

2. The communication system according to claim 1, wherein
the frequency selected by the radio wave receiver is defined as X megahertz,
the transmission rate of the transmission node is defined as Ya megabits per second, and the transmission node changes the transmission rate to satisfy X is equal to integral multiple of Ya.

3. The communication system according to claim 2, wherein
the transmission node changes the transmission rate to satisfy X=Ya.

4. The communication system according to claim 1, wherein
the transmission node notifies the radio wave receiver of change completion information upon completing a change of the transmission rate.

5. The communication system according to claim 4, wherein,
when the frequency is changed, the radio wave receiver starts and continues a muting process until receiving the change completion information from the transmission node.

6. The communication system according to claim 1, wherein
the transmission node adds transmission rate information indicating the transmission rate after change to the data to be transmitted to the reception node, and
the reception node changes a receiving rate of the data based on the transmission rate indicated by the transmission rate information.

7. The communication system according to claim 6, wherein
the frequency selected by the radio wave receiver is defined as X megahertz,
the receiving rate of the reception node is defined as Yb megabits per second, and
the reception node changes the receiving rate to satisfy X is equal to integral multiple of Yb.

8. The communication system according to claim 7, wherein
the reception node changes the receiving rate to satisfy X=Yb.

9. The communication system according to claim 6, wherein
the reception node notifies the radio wave receiver of change completion information upon completing a change of the receiving rate.

10. The communication system according to claim 9, wherein,
when the frequency is changed, the radio wave receiver starts and continues a muting process until receiving the change completion information from the reception node.

11. The communication system according to claim 1, wherein
the reception node changes the receiving rate of the data based on the frequency selected by the radio wave receiver.

* * * * *